United States Patent [19]
Roll

[11] 3,917,201
[45] Nov. 4, 1975

[54] VIBRATION ISOLATED TABLE WITH IMPROVED MOUNTS

[75] Inventor: Guy Roll, Wantagh, N.Y.

[73] Assignee: Ehrenreich Photo Optical Industries, Inc., Garden City, N.Y.

[22] Filed: Nov. 7, 1974

[21] Appl. No.: 521,888

[52] U.S. Cl. ................................................ 248/20
[51] Int. Cl.[2] ........................................ F16F 15/00
[58] Field of Search ............ 108/20, 136, 144, 147; 248/20, 22, 188.2, 188.5, 350, 358 R, 400

[56] References Cited
UNITED STATES PATENTS

| | | | |
|---|---|---|---|
| 3,578,278 | 5/1971 | Pickering | 248/20 |
| 3,784,146 | 1/1974 | Matthews | 248/22 X |

*Primary Examiner*—James C. Mitchell
*Attorney, Agent, or Firm*—Hopgood, Calimafde et al.

[57] ABSTRACT

In the use of certain types of delicate measuring apparatus, and in the use of high power optical instruments, and various other situations, it is highly desirable to have a table top or other surface free of all vibration. This disclosure relates to improvements in vibration isolated tables which have heavy table tops of high inertia supported on air mounts that damp out the vibrations of the ground or floor from which the table is ultimately supported. Improved air mount envelope constructions provide effective damping and convenient adjustment of the weight that the air mounts can support, and effective variations in the air mounts own natural frequency when necessary. Safety features protect against human error of excessive and insufficient pressure in the air mounts.

19 Claims, 7 Drawing Figures

U.S. Patent  Nov. 4, 1975  3,917,201
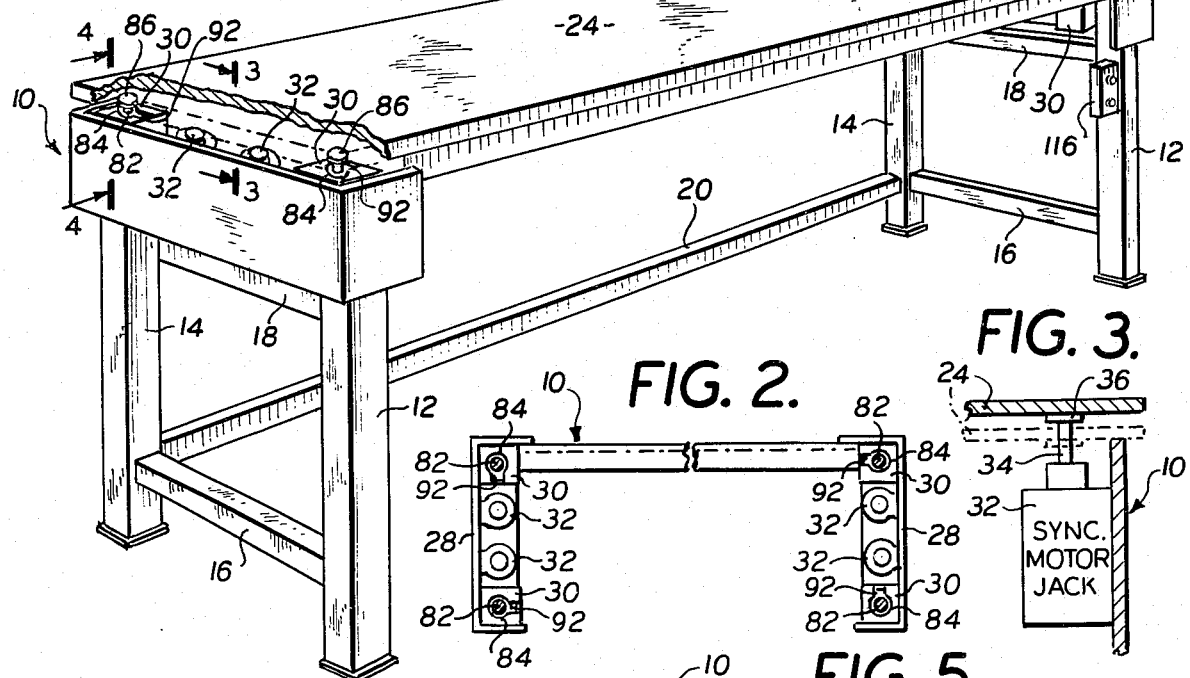
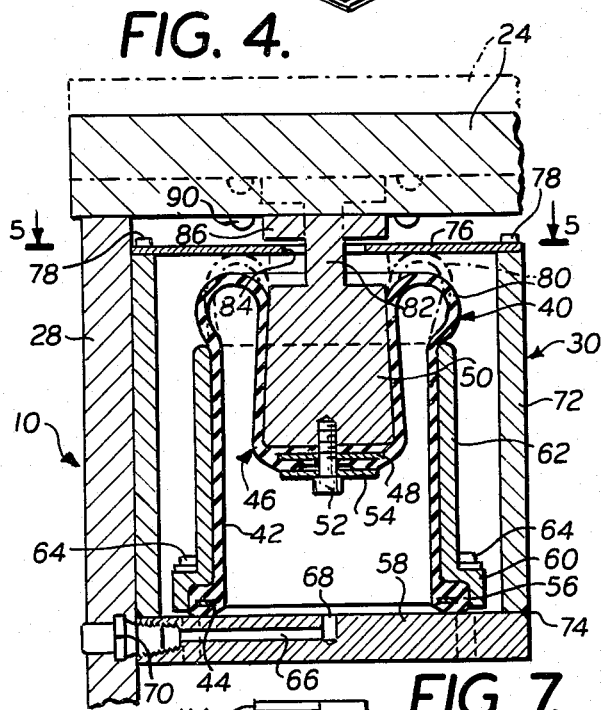
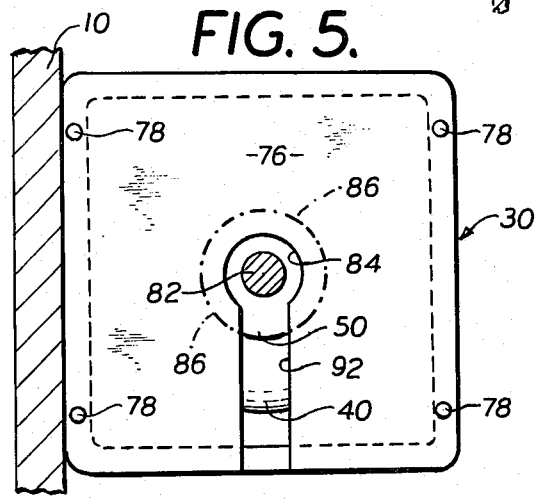
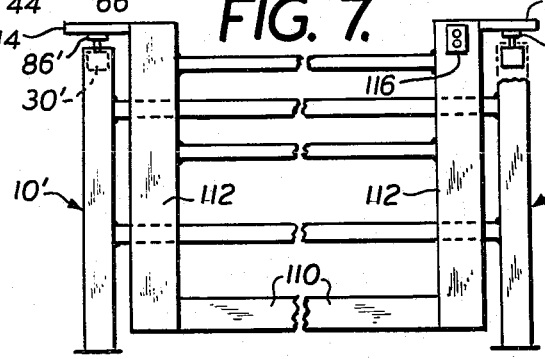
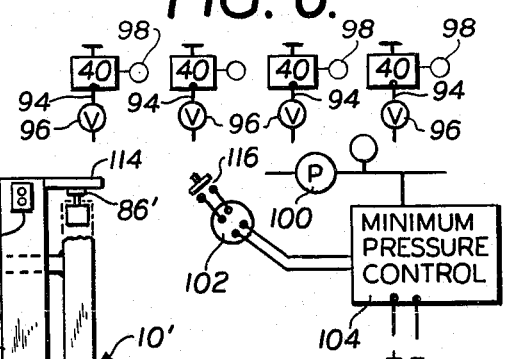

VIBRATION ISOLATED TABLE WITH IMPROVED MOUNTS

BACKGROUND AND SUMMARY OF THE INVENTION

The air mounts of this vibration isolated table are made with flexible envelopes of circular cross section and with provision for supporting the envelopes against flexing over most of their area while a mid portion is folded back on itself and is free to roll at its bend to permit movement of a piston that supports the table.

Effective and improved damping is obtained by having great flexibility at the fold back of the envelope and because of the limited area, where the envelope is exposed to pressure without mechanical restraint, the envelope can withstand much higher air pressure while still made with a relatively thin and flexible side wall.

The invention has provision for preventing damage to operators in the event of excessive pressure and blowout. One feature provides for automatic release of excessive pressure while maintaining equal pressure in all envelopes and for automatic increase in pressure in the event that air pressure drops below a pre-set minimum.

With the high inertia vibration isolated table supported entirely by the air mounts, provision is made for resisting horizontal displacement of the table without impairment of the low friction flexibility of the air mounts by which the table is supported.

Other features, advantages and objects of the invention will appear to be pointed out as the description proceeds.

BRIEF DESCRIPTION OF THE DRAWING

In the drawing, forming a part hereof, in which like reference characters indicated corresponding parts in all the views:

FIG. 1 is a diagrammatic, fragmentary view of a console vibration isolated table equipped with the air mounts and safety features of this invention;

FIG. 2 is a diagrammatic, fragmentary top plan view showing the locations of the air mounts and synchronous operated jacks that are used in the table of FIG. 1;

FIG. 3 is a diagrammatic view showing the principle of operation of one of the jacks;

FIG. 4 is a greatly enlarged sectional view through one of the air mounts used on the structure of FIGS. 1 and 2, the section being taken on the line 4—4 of FIG. 1;

FIG. 5 is a sectional view on the line 5—5 of FIG. 4.

FIG. 6 is a diagrammatic view showing one kind of control for which the invention is well adapted; and FIG. 7 is a diagrammatic front elevation of a modified form of the invention which substitutes a cradle table for the console shown in FIG. 1.

DESCRIPTION OF PREFERRED EMBODIMENT

FIG. 1 shows a supporting frame 10 with front legs 12 and back legs 14. The front and back legs at each end of the frame are connected together by lower structural sections 16 and upper structural sections 18 to form rigid end structures. In the preferred construction the front legs 12 have no connector between them but the back legs 14 have a longitudinal extending structural section 20 connecting them together; and a similar upper structural section which is hidden by the table top in FIG. 1; but which is preferably at the same height as the sections 18 of the end structures. The connecting structural sections 16, 18 and 20 can be welded to the parts that they connect, or connected in any other suitable way.

On top of the supporting frame 10 there is a table top 24 which is long enough to be supported at its opposite ends by the end frame structures; but the table top 24 is supported a slight distance above the supporting frame 10 when the table is being used as a vibration isolated table.

There are air mounts which rest on the supporting frame 10 near the corners of the table top 24 and these air mounts, which will be described in detail in connection with FIG. 4, act as vibration damping devices which prevent any vibration in the supporting frame 10 from reaching the table top 24.

In order to obtain adequate damping effect from the air mounts, the table top 24 is made with a very substantial mass so that it is not moved by vibration which are of a frequency high enough to otherwise be transmitted through the air mounts. Because of the great mass, and resulting inertia, the table top 24 is free of any environmental vibration such as would be transmitted to an ordinary table or work bench as the result of vibration of the floor or ground on which the legs of the table rest. Such vibration is common in many kinds of assembly plants as the result of heavy machinery in other parts of the plant and the movement of rolling stock over the floor or ground on which the supporting frame 10 rests.

The table top 24, because of its vibration isolation, can be used for the assembly of delicate equipment and the use of extremely accurate meters and high power optical equipment which cannot be used successfully on ordinary work benches or other tables which have no vibration isolating features.

FIG. 2 is a diagrammatic view showing the supporting frame 10 and the end structures, designated in FIG. 2 by the reference character 28. Each of these end structures has an air mount housing 30 in position to support the vibration isolated table out of contact with the supporting frame 10. There are also jacks 32 operated by synchronous motors or by manually-operated cams, for raising and lowering the table top to lift it from the air mounts when desired. There are some other structural features shown in FIG. 2 which will be explained more fully in describing the air mount housing.

FIG. 3 is a diagrammatic showing of one of the jacks 32. The jack has a vertically movable element 34 with a head 36 at its upper end for contact with the lower side of the vibration isolated table 24. When the jack 32 is at its most elevated position, it lifts the table 24 off the air mounts (not shown in FIG. 3); and when the jack 32 is at the other end of its stroke, it permits the table 24 to rest on portions of the supporting frame 10. Whenever the table 24 is supported by the jack 32, or is resting on the supporting frame 10, the air mounts are immobilized and the invention is not operating to isolate the table top 24 from vibration which is transmitted to the supporting frame 10 from the floor or ground as previously explained.

FIG. 4 shows one of the air mounts 40 which is contained in the air mount housing 30. The housing 30 is rigidly connected with the supporting frame 10. The air mount 40 includes an "envelope" 42 which is made of rubber or other tough and flexible material such as plastics which have similar characteristics to those of rubber. The envelope 42 is preferably molded and includes a reinforcing metal ring 44 at its open end. The other end of the envelope 42 is closed by a wall 46 which will be referred to herein as the top wall. This wall 46 contains a reinforcing ring 48.

A piston 50, which serves as a thrust element is connected to the outside of the wall 46 by a screw 52 or other suitable fastening means, which clamp the wall 46 between the lower end of the piston element 50 and an outer plate 54 which is preferably of circular cross section.

The lower portion of the envelope 42 is made with a flange 56 and it is clamped against a bottom 58 of the housing 30 by a flange 60 that constitutes the lower end of an inner housing 62. The flange 60 and inner housing 62 are secured to the bottom of the air mount housing 58 by fastening means, shown in FIG. 4 as screws 64.

The flange 60 of the envelope 42 is held against the bottom 58 with sufficient pressure to provide an airtight seal between the envelope and the bottom 58 of the air mount housing. There is a passage 66 leading through the bottom 58 and communicating with the interior of the envelope 42 through an air passage 68. Air, or other gas, is supplied to and withdrawn from the interior of the envelope 42 through the passages 66 and 68 which are controlled by a valve 70 and other air supply means which will be described in connection with FIG. 6.

The air mount housing 30 has a side wall 72 which is preferably a section of square tubing welded along a seam 74 to the bottom 58 of the air mount housing. A retaining plate 76 is detachably connected to the upper end of the wall 72 by screws 78 that extend through the retaining plate 76 at angularly spaced locations around the square wall 72.

Before the retaining plate 76 is placed on the housing 30, the piston 50 is pushed downward so as to fold the side wall of the envelope 42 back on itself as shown in FIG. 4. With the fold of the envelope 42 pushed down to a location slightly below the top of the side wall 72, the retaining plate is placed on the housing 30 and is secured to it by the screws 78.

With the retaining plate 76 closing the upper end of the housing 30, as shown in FIG. 4, the piston 50 is limited in its upward movement by striking against the lower face of the retaining plate 76. The parts are so proportioned that when the piston 50 rises into contact with retaining plate 76, the fold of the envelope, which fold is designated by the reference character 80, also comes in contact with the retaining plate 76. These positions are shown in dotted lines in FIG. 4.

The piston 50 has a reduced diameter portion 82 which extends upwardly through an opening 84 in the retaining plate 76. In practice, this opening 84 is of substantially twice the diameter of the piston extension 82 and both are of circular cross section.

At the upper end of the reduced diameter portion 82 of the piston 50 there is a flange 86 on which the vibration isolated table top 24 rests when the vibration isolating structure of the invention is mobilized. With the piston 50 in its full line position, shown in FIG. 4, the weight of the table 24, and any structure supported by the table, has pushed the piston 50 down and moved the top wall 46 of the envelop further into the envelope so that the fold 80 is at the level shown in full lines in FIG. 4.

It will be evident that such downward movement of the wall 46 compresses the air, or other gas, which is within the envelope 42. This raises the pressure in the envelope and permits it to exert a stronger force for holding the table 24 against further downward movement.

The stroke of the piston 50 is quite limited and since the load on the table 24 may vary greatly from one operation to another, it is necessary to control the air pressure in the envelope 42 so that the piston 50 will be balanced at an intermediate part of its stroke and the table 24 supported, therefore, entirely by the air pressure in the envelope 42. This permits the air mount to operate as a damping device for preventing vibration of the supporting frame 10 from reaching the vibration isolated table 24.

When the air pressure in the envelope 42 is released, the envelope 42 sags under the weight of the piston 50 so that the fold 80 rolls down far enough for the flange 86 of the piston to come in contact with the retaining plate 76 at a level so low that the table 24 will rest on the upper end of the supporting frame 10.

Because of the mass of the table 24, provision is made for lifting the table 24 far enough above the retaining plate 76 so that access can be had to the air mount housing 30 when necessary. This raising of the table 24 is accomplished by the jacks 32 previously described. The jacks are operated by synchronous motors so that they raise the table top 24 evenly.

The piston 50 is tapered to a smaller diameter as it extends upward from the end wall 46. This permits a larger radius for the fold of the envelope 42. The upper end of the inner housing 62 is preferably curved, as shown in FIG. 4, so that it does not provide a sharp corner against the outside surface of the envelope 42 when the pressure in the envelope causes it to expand at the upper end of the inner housing 62 as shown to a limited degree in FIG. 4. The extent to which the envelope 42 swells outwardly above the upper end of the inner housing 62 depends upon the pressure within the envelope; and this in turn depends upon the amount of weight on the table 24 which has to be balanced by the pressure in the air mounts.

The flange 86 can fit into a recess in the lower face of the table 24; but the drawing shows the table 24 with a bead 90 which is attached to the underside of the table 24 and which extends in a circle around the flange 86.

When the table 24 is supported entirely by the air mounts, some provision must be made to limit any horizontal movement of the table 24 caused by someone or something striking against an edge of the table. Such a horizontal displacement of the table 24 will rock the air mounts because of the flexibility of the envelopes 42 where they extend above the top of the inner housing 62. The edge of the opening 84, in the retaining plate 76, provides a mechanical stop or abutment that limits any horizontal movement of the table 24 by limiting the horizontal movement of the reduced diameter portions 82 of the piston 50. By making the diameter of the opening 84 only slightly larger than that of the reduced diameter portion 82 of the piston, the displacement of the piston horizontally can be very limited. In the structure shown in FIG. 4, the portion 82 can move off center in any direction by a distance on only one-half of the diameter of the piston portion 82. This movement will cause the portion 82 to strike against the retaining plate 78.

It will be apparent that any limit can be imposed on the horizontal movement of the table 24, when supported by the air mounts, by proportioning the diameters of the opening 84 and the piston portion 82. In order to get the piston portion 82 into the opening 84, it is necessary to have a slot 92 (FIG. 2) leading from the edge of the retaining plate 76 into the opening 84. Movement of the piston portion 82 toward this slot 92 would not provide any restraint to the horizontal movement of the table 24.

In order to always have a mechanical restraint on horizontal movement of the table 24, regardless of the direction in which it is displaced, the different retaining plates 76 are oriented so that their slots 92 extend in different directions. Thus, no matter which way the table is horizontally displaced, there will be three pistons of the air mounts which are so oriented with respect to the slot 92 that they will strike against the edge of the opening 84 (FIG. 4) and mechanically limit further movement of the table 24. For most directions of displacement of the table 24, all of the piston portions 82 will strike against edges of their corresponding openings 84.

FIG. 6 is a piping diagram showing one way in which vibration isolation table structure can be operated. Each of the air mounts 40 has an air line 94 for supplying air to the mount or exhausting air when pressure is to be reduced. When the pressure in the air mounts exceeds a preset setting of an adjustable relief valve 96, on each of the airlines 94, air or other gas will escape from the air mount 40 to reduce the pressure to the setting of the relief valve 96. The relief valve 96 can also be operated manually to reduce pressure in the air mounts when desired and may be a gauge 98 for indicating the existing pressure in the air mounts.

The diagram shown in FIG. 6 is merely illustrative of one way in which the pressure of the air mounts can be controlled. It will be evident that there are many other ways by which they can be controlled and the requirement is that there must be sufficient air pressure in the air mounts, when the invention is being used as a vibration isolated table, to balance the force of the air mounts against the weight of the table 24 and such structure as is supported by the table.

FIG. 1 shown a structure which can be described as an air mounted console; but for many purposes it may be more convenient to have a cradle system on which objects can be loaded without raising them much above the supporting floor or other surface on which the supporting frame of the apparatus rests. FIG. 7 shows such a cradle system. A table 110 is supported by tension elements 112 extending down from upper frames 114.

A manually operated switch 116 on the frame 10 controls the air pressure to the air mounts.

These upper frames 114 are supported by air mounts and have provisions for lifting them above the air mounts by jack screws, as already described in connection with the description of the structure associated with FIG. 1. When the upper frames 114 are supported entirely by the air mounts, the cradle table 110 is a vibration isolated table.

There is ample clearance between the tension elements 112 and the parts of the supporting frame 10' so that the cradle table 110, tension elements 112, and upper frame elements 114 can have limited horizontal movement, if accidentally displaced by someone or something striking against the cradle structure. Such horizontal displacement is limited in FIG. 7 in the same way as already described in connection with the other figures and particularly FIGS. 2 and 4 which show the way in which the retaining plates 76 have openings with edges around the piston portions of the air mounts for providing mechanical stops to limit any horizontal movement of the vibration isolated table when supported by the air mounts.

The construction shown in FIG. 1 can be reversed by connecting the air mounts 40 to the bottom of the table top 24 instead of to the support 10. When the positions of the air mounts are thus reversed, the flanges 86 will rest on whatever support is used under them and air mounts will isolate the table from any vibration of the support in the same way and operating on the same principle as already described in FIG. 1.

When the air mounts are attached to the table, it is practical to use a table of relatively small size which can be placed on a work bench or other convenient location; but it is still necessary that the table have substantial mass so that it's inertia will be effective to prevent transmission of vibrations to delicate instruments on the table or plate supported by the air mounts.

The preferred embodiment of the invention has been illustrated and described, but changes and modifications can be made and some features can be used in different combinations without departing from the invention as defined in the claims.

What is claimed is:

1. A vibration isolation table including in combination a supporting frame that rests on an underlying surface which is subject to vibration, a high inertia table top supported from said frame, vibration damping mounts between the table top and the supporting frame, each of said mounts comprising a flexible envelope of substantially annular cross section, a thrust element located between the flexible envelope and the table, and a retainer plate fixed to the frame and having an opening through which a part of the thrust element extends, said plate being in a position between the table and a surface of the thrust element, the retainer having a surface that confronts said surface of the thrust element and that constitutes a mechanical stop to limit motion of the thrust element in the direction that the thrust element is moved by gas pressure in the envelope.

2. The vibration isolation table described in claim 1 characterized by the flexible envelope being folded back on itself and having an upwardly-extending portion, a folded portion, one side of which merges with the top of said upwardly extending portion, and a downwardly extending portion on the other side of the folded portion and extending downwardly within the upwardly-extending portion, a wall closing the envelope at the lower end of the downwardly extending portion, a housing surrounding the upwardly-extending portion and providing hoop strngth fo prevent distortion of the envelope by the gas pressure within the envelope, the upper end of the housing being below the fold when the table top is resting on the frame the thrust element being connected to the wall that closes the downwardly-extending portion of said envelope.

3. The vibration isolation table described in claim 2 characterized by the thrust element filling the space surrounded by the downwardly-extending portion of the envelope.

4. The vibration isolation table described in claim 3 characterized by the thrust element being tapered to progressively larger diameter toward the wall at the lower end of the downwardly-extending portion of the envelope said wall having a circular shape, fastening means extending through the end wall and connecting said end wall to the thrust element, and said thrust element being surrounded by the downwardly-extending portion of the envelope for substantially the full axial length of said downwardly-extending portion.

5. A vibration isolation table including in combination a supporting frame that rests on an underlying surface which is subject to vibration, a high inertia table top supported from said frame, vibration damping mounts between the table top and the supporting frame, each of said mounts comprising a flexible envelope of substantially annular cross section, a thrust element located between the flexible envelope and the table, a stiff sleeve surrounding the outside of the envelope for most of the length of the envelope below the fold and constructed and arranged to confine the part of the envelope, which extends down from the outside of the fold, against outward radial distortion, said sleeve being concentric with the envelope, said sleeve extending downwardly along the outside of the envelope to the lower end thereof below the thrust element and remote from the fold, and the fold above the sleeve comprising at least 180° of curvature.

6. The vibration isolation table described in claim 1 characterized by a guard housing surrounding the outside of the envelope on all sides so that no part of the envelope can escape from the guard housing in the event of a rupture of the envelope by excessive pressure.

7. The vibration isolation table described in claim 1 characterized by one end of the envelope being folded back on itself and into the rest of the envelope for a part of the axial length of the envelope and the retainer plate beyond but adjacent to the fold of the envelope at a location to prevent expansion of the envelope axially far enough to eliminate said fold.

8. The vibration isolation table described in claim 7 characterized by a reduced diameter extension of the thrust element constituting an integral part thereof and extending through the opening in the retainer plate.

9. A vibration isolation table including in combination a supporting frame that rests on an underlying surface which is subject to vibration, a high inertia table supported from said frame, vibration damping mounts between the table and the supporting frame, each of said mounts comprising a flexible envelope of substantially annular cross section, a thrust element located between the flexible element and the table, and a retainer in position to stop motion of the thruse element to limit the stroke thereof in the directionn that the thrust element is moved by gas pressure in the envelope, characterized by a reduced diameter extension of the thrust element constituting an integral part thereof and extending through the opening in the retainer plate, and further characterized by a flange on the thrust element and constituting a part thereof and located beyond the opening and constituting an integral part of the reduced diameter extension of the thrust element for limiting movement of the thrust element in a direction toward the envelope, the opening through the retainer plate being of slightly greater diameter than the reduced diameter portion of the thrust element whereby the side wall of the opening limits any radial displacement of the reduced diameter portion of the thrust element, a slot in the retainer plate extending from the opening to the edge of the retainer plate and of a width as great as the reduced diameter of the thrust element whereby the retainer plate can be assembled with the thrust element by sliding said reduced diameter portion through the slot, similar envelopes and thrust element assemblies at different locations under the table with the slots in the retainer plates of different assemblies extending in different directions so that simultaneous radial movement of all of the thrust element by a horizontal force against the table will cause most of the thrust elements to contact with sides of the retainer plate openings at locations angularly removed from the slots in the retainer plates.

10. The vibration isolation table described in claim 9 characterized by the thrust elements of the differnt assemblies supporting the table, when in use, and comprising the only support for the table whereby vibration of the supporting frame is damped by the envelopes and does not reach the vibration isolated table.

11. The vibration isolation table described in claim 1 characterized by means for controlling a supply of compressible gas to and from the envelope.

12. The vibration isolation table described in claim 1 characterized by surfaces on the supporting frame in position to contact with the vibration isolation table and to support said table when thrust elements are near one end of their stroke whereby the vibration damping system is out of operation and the table is immobilized by resting on the supporting frame.

13. The vibration isolation table described in claim 12 characterized by motor-operated jacks on the supporting frame for lifting the table and supporting it independently of the vibration damping mounts provided by the envelopes.

14. The vibration isolation table described in claim 13 characterized by a synchronous electric motor connected with each of the motor-operated jacks for operating said jacks at equal rates of lift to raise the table uniformly.

15. The vibration isolation table described in claim 1 characterized by valves for controlling the amount of gas in the envelopes and thereby tuning vibration damping mounts to different natural frequencies, and a manual switch on the frame for controlling the gas supply.

16. The vibration isolation table described in claim 1 characterized by a plurality of vibration damping mounts at different locations, piping by which air is supplied to, exhausted from, the envelopes of the different mounts, and valve means that automatically relieve pressure in the piping and envelopes when the pressure exceeds a predetermined maximum, and through which gas can be supplied under pressure to the air mounts.

17. The vibration isolation table described in claim 1 characterized by a cradle supported at opposite ends by the supporting frame, tension elements that extend downwardly from the ends of the cradle, and means connecting the high inertia table with the rest of the cradle at the lower ends of the downwardly extending tension elements.

18. The vibration isolation table described in claim 4 characterized by the circular end wall being made of soft elastic material, and a circular metallic reinforcing plate embedded in the elastic material of the wall and having a diameter substantially greater than one-half the diameter of the bottom.

19. The vibration isolation table described in claim 18 characterized by the fastening means comprising a stiff washer of less diameter than the lower end of the thrust element and clamped against the wall by a screw that connects with the thrust element and that tightly clamps the reinforced wall between said washer and the thrust element.

* * * * *